Figure 2:
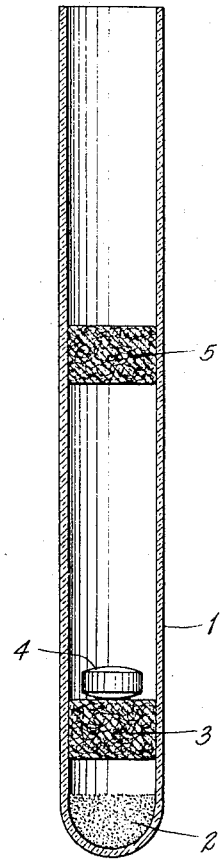

Sept. 21, 1943.                R. E. MULLIGAN                2,329,928
                STERILIZING MEDICINAL PELLETS OR THE LIKE
                          Filed Feb. 2, 1942

INVENTOR:
Robert E. Mulligan,
by Can Olau Gravely,
                HIS ATTORNEYS.

Patented Sept. 21, 1943

2,329,928

UNITED STATES PATENT OFFICE 2,329,928

STERILIZING MEDICINAL PELLETS OR THE LIKE

Robert E. Mulligan, East St. Louis, Ill., assignor to The Blue Line Chemical Co., St. Louis, Mo., a corporation of Missouri Application February 2, 1942, Serial No. 429,170

11 Claims. (Cl. 21—2)

My invention relates to the sterilization of medicinal pellets, particularly to the sterilization of pellets unable to withstand the high temperatures necessary for sterilization by heat. Specifically, the invention relates to the sterilization of a potent thermolabile drug for subcutaneous implantation in human subjects, such as diethylstilbestrol dipropionate. This and other drugs melt or deteriorate at around 106 to 107 degrees centigrade, whereas a temperature about that high is required to produce sterilization. Attempts to accomplish sterilization by intermittent heating at temperatures low enough to prevent charring have been found not dependable in effecting sterilization.

The principal object of the invention is a process which will effect complete sterilization of a medicinal substance of low melting point without any deleterious effect on the substance itself. A further object is a process which is particularly adapted for the sterilization and sealing of single pellets in individual containers or ampuls. Other objects and advantages will appear hereinafter.

The invention consists in placing in the bottom of a test tube, a sterilizing agent, non-reactive with the pellet to be sterilized and having the capacity of sublimation at a temperature low enough to have no harmful effect on the medicinal pellet, placing a pledget of cotton or the like above said sterilizing material, placing the medicinal pellet on said pledget, heating the test tube to completely gasify the sterilizing material and drive off the resulting gas and then sealing off the open end of the test tube. The invention further consists in the process and in the sequence of operations hereinafter described and claimed.

Figure 3:
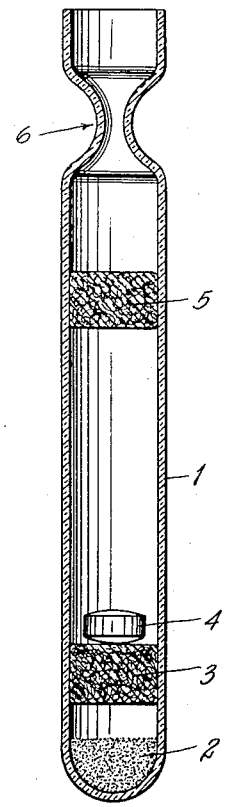
Figure 4:
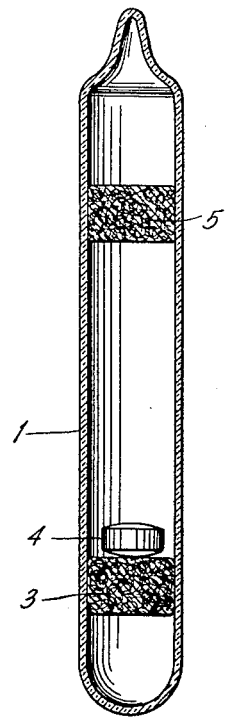
Figure 1:
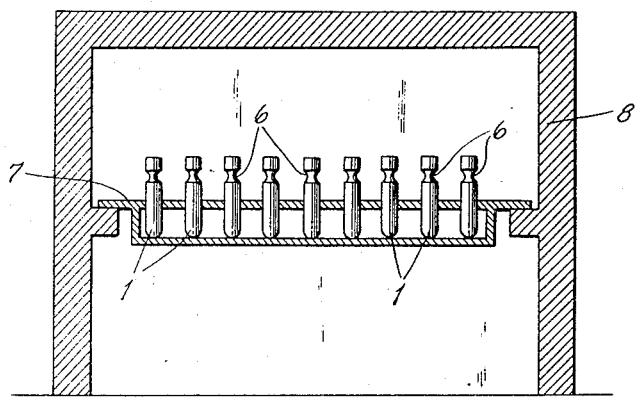

In the drawing,

Fig. 1 is a diagrammatic sectional view of a furnace and a plurality of test tubes arranged to practice my invention, Fig. 2 is an enlarged sectional view of a test tube with the several materials in place just before the construction of the tube near the upper end, Fig. 3 is an enlarged sectional view of a test tube after constriction; and Fig. 4 is an enlarged sectional view of the completed ampul after the sterilizing operation.

In the bottom of a test tube 1 of thin-walled soft glass, say about three inches long by three-eighths inch in diameter, is placed a suitable quantity, say about fifteen milligrams, of powdered paraformaldehyde 2. Above the paraformaldehyde is placed a pledget 3 of hospital cotton or like fluffy, open material. On this pledget 3 is placed a pellet 4 of diethylstilbestrol dipropionate, say of about one-hundred milligrams in weight. Near the top of the test tube is placed a second cotton pledget 5 and the glass tube is heated and constricted as at 6 to leave only a very small opening above the upper pledget 5.

A plurality of the filled test tubes 1 are placed in a rack 7 or other suitable support which is then placed in a suitable oven 8. This oven is heated to a temperature (about sixty degrees centigrade) sufficient to slowly vaporize the paraformaldehyde, which sublimes, that is, passes from the solid directly to the gaseous state without intermediate liquefaction. The heating is continued for such time, usually about twenty-four hours, as is required to drive off the formaldehyde so that no formaldehyde odor is perceptible at the top of the tubes. Each tube is then promptly sealed off, as by a gas flame, at the constricted upper end. The cotton pledgets permit the passage and escape of the gasified formaldehyde. The upper pledget prevents recontamination of the pellet during the slight interval before the end of the tube is sealed off.

Each sealed tube obviously constitutes a hermetically sealed ampul which carries a single sterile pellet ready for use. The process is particularly applicable to pellets which are used individually, as pellets used for subcutaneous implantation in human subjects.

The details above given are for the purpose of illustration and subject to wide variation. The size of the opening at the end of the test tube obviously need be sufficient only to permit insertion of the sterilizing material, the cotton pledgets and the pellet to be sterilized. While the process has been described in connection with the sterilization of pellets of diethylstilbestrol dipropionate by means of paraformaldehyde, the process is applicable to the sterilization of other medicinal pellets and other sterilizing agents may be used, particularly those agents having the property of sublimation. It is essential that the sterilizing agent selected be not reactive with the material being sterilized and it is highly advantageous that it have the property of sublimation.

What I claim is:

1. The process of sterilizing a medicinal pellet, which comprises placing in the bottom of a test tube a sterilizing agent non-reactive with said medicinal pellet, placing a cotton pledget above said sterilizing agent, placing a medicinal pellet on said pledget, heating the tube to completely gasify the sterilizing agent and drive off the gas and then sealing the end of the tube.

2. The process of sterilizing a medicinal pellet, which comprises placing in the bottom of a test tube a sterilizing agent having the property of sublimation and non-reactive with said medicinal pellet, placing a cotton pledget above said sterilizing agent, placing a medicinal pellet on said pledget, heating the tube to completely gasify the sterilizing agent and drive off the gas and then sealing the end of the tube.

3. The process of sterilizing a medicinal pellet, which comprises placing in the bottom of a test tube a sterilizing agent having the property of sublimation and non-reactive with said medicinal pellet, placing a cotton pledget above said sterilizing agent, placing a medicinal pellet on said pledget, placing a cotton pledget in said tube above said pellet, heating the tube to completely gasify the sterilizing agent and drive off the gas and then sealing the end of the tube.

4. The process of sterilizing a medicinal pellet, which comprises placing in the bottom of a test tube a sterilizing agent having the property of sublimation and non-reactive with said medicinal pellet, placing a cotton pledget above said sterilizing agent, placing a medicinal pellet on said pledget, placing a cotton pledget in said tube above said pellet, constricting the tube above said upper pledget, heating the tube to completely gasify the sterilizing agent and drive off the gas and then sealing the end of the tube.

5. The process of sterilizing a pellet of diethylstilbestrol dipropionate, which comprises placing powdered paraformaldehyde in the bottom of a test tube, placing a cotton pledget above said paraformaldehyde, placing said pellet on said pledget, heating the tube to completely gasify the paraformaldehyde and drive off the gas and then sealing the end of the tube.

6. The process of sterilizing a pellet of diethylstilbestrol dipropionate, which comprises placing powdered paraformaldehyde in the bottom of a test tube, placing a cotton pledget above said paraformaldehyde, placing said pellet on said pledget, placing a cotton pledget in said tube above said pellet, heating the tube to completely gasify the paraformaldehyde and drive off the gas and then sealing the end of the tube.

7. The process of sterilizing a pellet of diethylstilbestrol dipropionate, which comprises placing powdered paraformaldehyde in the bottom of a test tube, placing a cotton pledget above said paraformaldehyde, placing said pellet on said pledget, placing a cotton pledget in said tube above said pellet, constricting said tube above said upper pledget, heating the tube to completely gasify the paraformaldehyde and drive off the gas and then sealing the end of the tube.

8. The process of sterilizing a medicinal pellet, which comprises placing in the bottom of a test tube a sterilizing agent non-reactive with said medicinal pellet, placing a cotton pledget above said sterilizing agent, placing a medicinal pellet on said pledget, heating the tube to a temperature insufficient to sterilize said pellet but high enough to completely gasify the sterilizing agent and drive off the gas and then sealing the end of the tube.

9. The process of sterilizing a medicinal pellet, which comprises placing in the bottom of a test tube a sterilizing agent having the property of sublimation and non-reactive with said medicinal pellet, placing a cotton pledget above said sterilizing agent, placing a medicinal pellet on said pledget, heating the tube to a temperature insufficient to sterilize said pellet but high enough to completely gasify the sterilizing agent and drive off the gas and then sealing the end of the tube.

10. The process of sterilizing a pellet of diethylstilbestrol dipropionate, which comprises placing powdered paraformaldehyde in the bottom of a test tube, placing a cotton pledget above said paraformaldehyde, placing said pellet on said pledget, heating the tube to a temperature insufficient to sterilize said pellet but high enough to completely gasify the paraformaldehyde and drive off the gas and then sealing the end of the tube.

11. The process of sterilizing a pellet of diethylstilbestrol dipropionate, which comprises placing powdered paraformaldehyde in the bottom of a test tube, placing a cotton pledget above said paraformaldehyde, placing said pellet on said pledget, placing a cotton pledget in said tube above said pellet, heating the tube to a temperature insufficient to sterilize said pellet but high enough to completely gasify the paraformaldehyde and drive off the gas and then sealing the end of the tube.

ROBERT E. MULLIGAN.

CERTIFICATE OF CORRECTION.

Patent No. 2,329,928.  September 21, 1943.

ROBERT E. MULLIGAN.

It is hereby certified that error appears in the printed specification of the above numbered patent requiring correction as follows: Page 1, first column, line 45, for the word "construction" read --constriction--; and that the said Letters Patent should be read with this correction therein that the same may conform to the record of the case in the Patent Office.

Signed and sealed this 30th day of November, A. D. 1943.

(Seal)

Henry Van Arsdale,
Acting Commissioner of Patents.